US012464290B2

(12) United States Patent
Hosoi et al.

(10) Patent No.: US 12,464,290 B2
(45) Date of Patent: Nov. 4, 2025

(54) VIBRATOR AND HEARING DEVICE

(71) Applicant: FINEWELL CO., LTD., Osaka (JP)

(72) Inventors: Hiroshi Hosoi, Osaka (JP); Katsushi Ueno, Yamagata (JP)

(73) Assignee: Finewell Co., Ltd., Osaka (JP)

( * ) Notice: Subject to any disclaimer, the term of this patent is extended or adjusted under 35 U.S.C. 154(b) by 39 days.

(21) Appl. No.: 18/288,976

(22) PCT Filed: Sep. 14, 2022

(86) PCT No.: PCT/JP2022/034333
§ 371 (c)(1),
(2) Date: Oct. 30, 2023

(87) PCT Pub. No.: WO2023/053958
PCT Pub. Date: Apr. 6, 2023

(65) Prior Publication Data

US 2024/0223957 A1 Jul. 4, 2024

(30) Foreign Application Priority Data

Oct. 1, 2021 (JP) ................................ 2021-162849

(51) Int. Cl.
*H04R 9/06* (2006.01)
*H04R 1/10* (2006.01)
*H04R 9/04* (2006.01)
*H04R 25/00* (2006.01)

(52) U.S. Cl.
CPC ............... *H04R 9/046* (2013.01); *H04R 1/10* (2013.01); *H04R 1/1016* (2013.01); *H04R 9/043* (2013.01);
(Continued)

(58) Field of Classification Search
CPC .......... H04R 1/00; H04R 1/10; H04R 1/1016; H04R 7/045; H04R 9/043; H04R 9/046;
(Continued)

(56) References Cited

U.S. PATENT DOCUMENTS

2003/0081000 A1 5/2003 Watanabe et al.
2003/0169895 A1* 9/2003 Fukuyama ............... G10K 9/22 381/368

(Continued)

FOREIGN PATENT DOCUMENTS

CN 209805645 U 12/2019
CN 114071334 A 2/2022

(Continued)

OTHER PUBLICATIONS

Office Action in Taiwanese Appln. No. 112151074, mailed on Dec. 17, 2024, 10 pages (with English translation).

(Continued)

*Primary Examiner* — Huyen D Le
(74) *Attorney, Agent, or Firm* — Fish & Richardson P.C.

(57) ABSTRACT

A vibrator includes a yoke, a coil bobbin, a coil wound around the coil bobbin, a magnet, a damper, a frame, and a case housing the yoke, the coil bobbin, the coil, the magnet, the damper, and the frame. An outer edge portion of the damper is fixed to the case. The bottom face of an inner edge portion of the damper makes contact with the top end of the circumferential wall portion of the yoke. The frame is swaged to be fixed to the damper and the yoke so as to make contact with the top face of the inner edge portion of the damper and the inner surface of the circumferential wall portion of the yoke.

11 Claims, 12 Drawing Sheets

(52) U.S. Cl.
CPC ............. *H04R 9/06* (2013.01); *H04R 25/606* (2013.01); *H04R 2400/03* (2013.01); *H04R 2400/07* (2013.01); *H04R 2499/11* (2013.01)

(58) Field of Classification Search
CPC ........ H04R 9/06; H04R 11/02; H04R 25/606; H04R 2400/03; H04R 2400/07; H04R 2499/11
See application file for complete search history.

(56) References Cited

U.S. PATENT DOCUMENTS

| | | | | |
|---|---|---|---|---|
| 2006/0165249 | A1 | 7/2006 | Sato | |
| 2006/0226714 | A1 | 10/2006 | Miura | |
| 2006/0244400 | A1* | 11/2006 | Miura | H02K 33/18 318/128 |
| 2011/0274308 | A1* | 11/2011 | Doh | H04R 9/06 381/398 |

FOREIGN PATENT DOCUMENTS

| | | |
|---|---|---|
| CN | 216313372 U | 4/2022 |
| JP | 2003-150542 | 5/2003 |
| JP | 2006-203709 | 8/2006 |
| JP | 2015-186102 | 10/2015 |
| JP | 2016-116177 | 6/2016 |
| JP | 2018-117203 | 7/2018 |
| JP | 6618230 | 12/2019 |
| WO | WO 2004/006620 | 1/2004 |
| WO | WO 2009/133986 | 11/2009 |
| WO | WO 2023/053958 | 4/2023 |

OTHER PUBLICATIONS

International Search Report in International Appln. No. PCT/JP2022/034333, mailed on Dec. 6, 2022, 4 pages (with machine translation).

* cited by examiner

VIBRATOR AND HEARING DEVICE

CROSS REFERENCE OF RELATED APPLICATIONS

This application is a U.S. National Phase application under 35 U.S.C. § 371 of International Patent Application No. PCT/JP2022/034333, filed on Sep. 14, 2022, which claims the priority of Japanese Patent Application No. 2021-162849, filed on Oct. 1, 2021, the disclosure of which is incorporated herein by reference in its entirety.

TECHNICAL FIELD

The present invention relates to a vibrator and a hearing device.

BACKGROUND ART

Conventionally, various devices that transmit vibration to a target object to enable sound perception, such as bone conduction devices, bone conduction speakers, and bone conduction vibrators, have been developed (Patent Documents 1 to 5).

CITATION LIST

Patent Literature

Patent Document 1: JP-A-2003-150542
Patent Document 2: Japanese Patent No. 6618230
Patent Document 3: JP-A-2015-186102
Patent Document 4: JP-A-2016-116177
Patent Document 5: JP-A-2018-117203

SUMMARY OF INVENTION

Technical Problem

Inconveniently, these devices still leave much room for further studies.

In view of the above situation, an object of the present invention is to provide more useful vibrators and hearing devices.

Solution to Problem

To achieve the above object, according to one aspect of the present invention, a vibrator includes a yoke that is open at its top end and that has a bottom portion and a circumferential wall portion, a coil bobbin of which at least part is arranged inside the yoke, a coil that is wound around the coil bobbin, a magnet of which at least part is arranged inside the coil bobbin, a damper that supports the yoke, a frame that fixes the damper to the yoke, and a case for housing the yoke, the coil bobbin, the coil, the magnet, the damper, and the frame. An outer edge portion of the damper is fixed to the case. The bottom face of an inner edge portion of the damper makes contact with the top end of the circumferential wall portion of the yoke, and the frame is swaged to be fixed to the damper and the yoke so as to make contact with the top face of the inner edge portion of the damper and with the inner surface of the circumferential wall portion of the yoke.

According to another aspect of the present invention, the top end of the coil bobbin may make contact with the inner surface of the case.

According to another aspect of the present invention, there may be further provided a top plate arranged inside the coil bobbin. The magnet may include a first magnet and a second magnet. The first magnet may be arranged over the top plate, and the second magnet may be arranged under the top plate.

According to another aspect of the present invention, the shape of the inner bottom of the yoke may correspond to the shape of the bottom end of the second magnet so that the bottom end of the second magnet can be fixed inside the yoke.

According to another aspect of the present invention, the frame and the yoke may be formed of a soft magnetic material or soft magnetic materials.

According to another aspect of the present invention, at least parts of the frame and the circumferential wall portion of the yoke may face the coil.

According to another aspect of the present invention, the damper may have a through hole formed in it so as to penetrate the damper in an up-down direction.

According to another aspect of the present invention, the case may include an upper case and a lower case, and the outer edge portion of the damper is held between the upper case and the lower case.

According to the present invention, the upper case may have a wiring hole through which a cable is passed.

According to another aspect of the present invention, there may be further provided a closing member for covering the wiring hole so that the case can be sealed.

According to a further aspect of the present invention, a hearing device includes the vibrator of any of the configurations described above as a cartilage conduction vibrator for transmitting a sound signal to an ear cartilage.

Advantageous Effects of Invention

As described above, with the present invention, it is possible to provide more useful vibrators and hearing devices.

DESCRIPTION OF EMBODIMENTS

<Vibrator>

Figure 1:
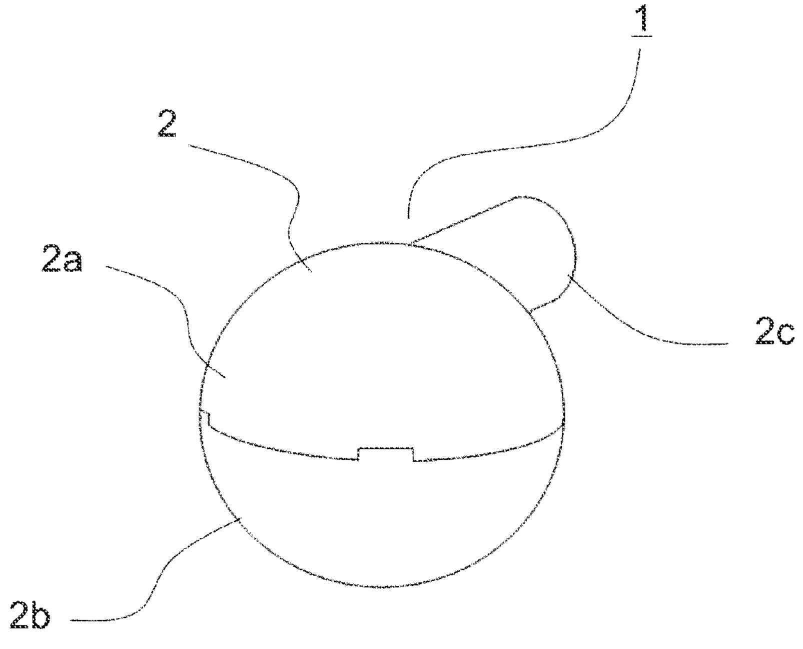
FIG. 1 is a perspective view illustrating a vibrator in a hearing device according to an embodiment of the present invention.
Figure 2:
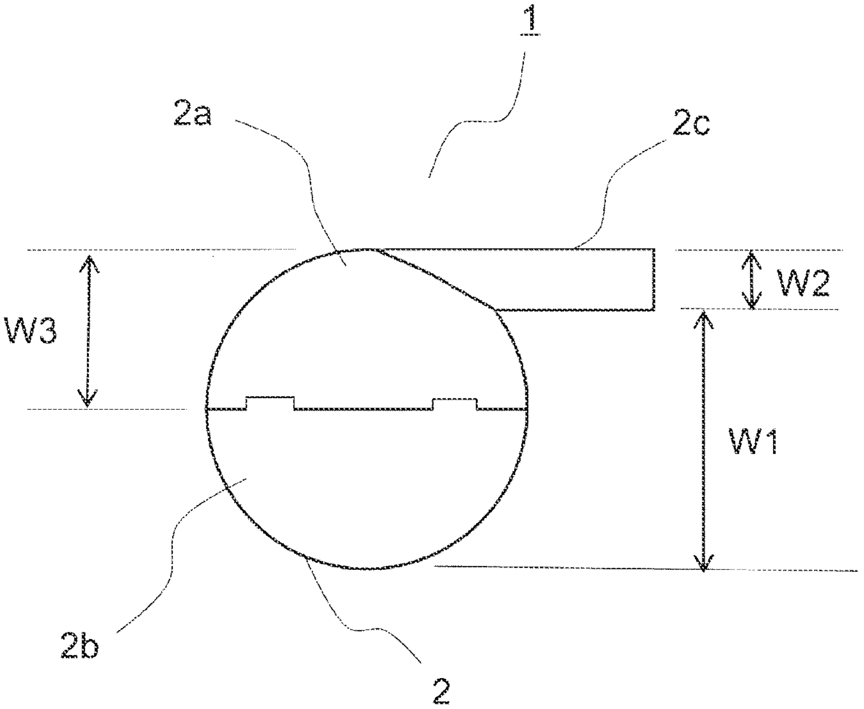
FIG. 2 is a side view illustrating the vibrator in the hearing device according to the embodiment of the present invention.
Figure 3:
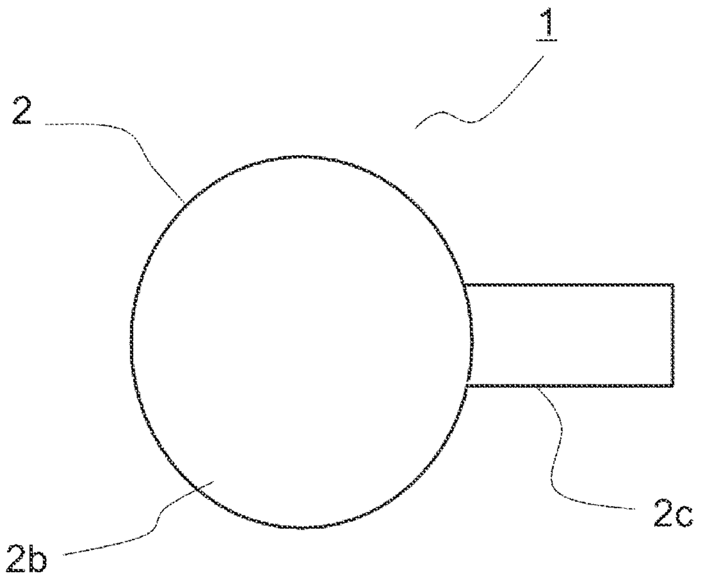
FIG. 3 is a bottom view illustrating the vibrator in the hearing device according to the embodiment of the present invention.
Figure 4:
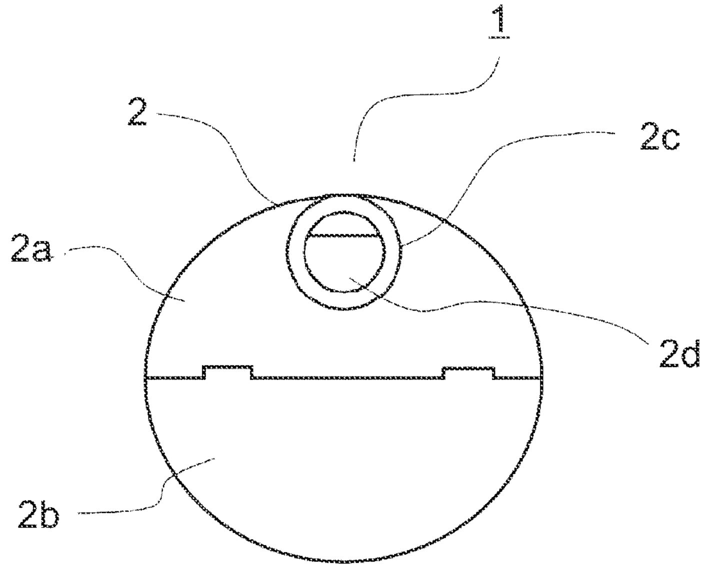
FIG. 4 is a back view illustrating the vibrator in the hearing device according to the embodiment of the present invention.

FIG. 1 is a perspective view illustrating a vibrator 1 in a hearing device according to an embodiment of the present invention. FIGS. 2, 3, and 4 are side view, a bottom view, and a back view, respectively, of the vibrator 1.

A case 2 of the vibrator 1 is composed of an upper case 2*a* and a lower case 2*b*. The upper case 2*a* and the lower case 2*b* are fixed to each other with adhesive or the like. On the upper case 2*a*, a projection 2*c* is formed. The case 2 is formed of resin (for example, ABS resin) or the like.

Figure 8:
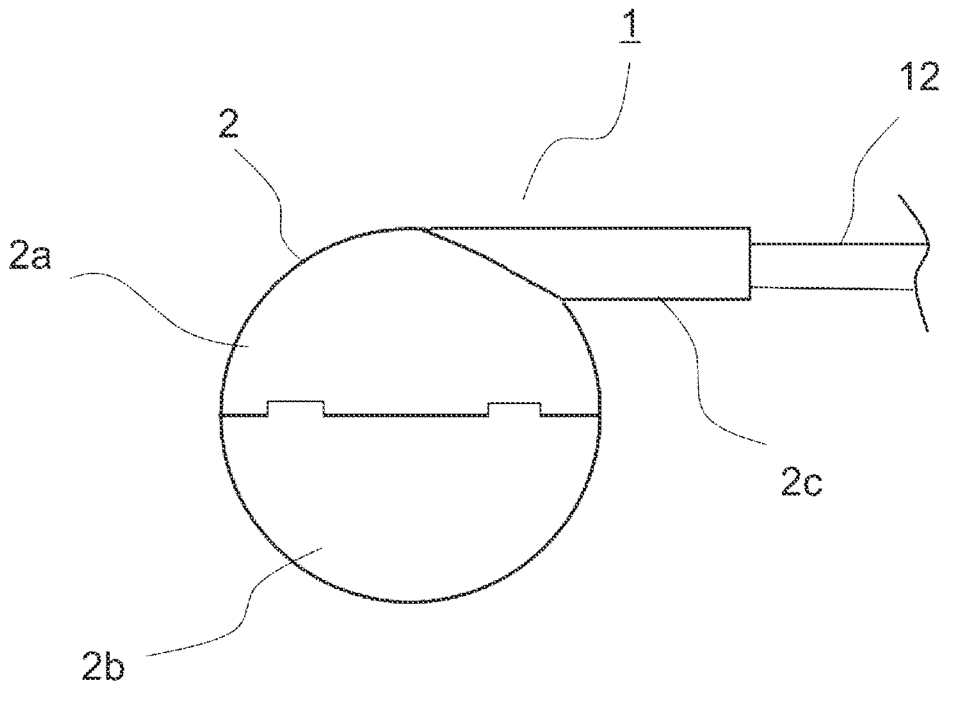
FIG. 8 is a side view showing the vibrator in the hearing device according to the embodiment of the present invention, with a cable connected to it.

The projection 2*c* on the upper case 2*a* has a wiring hole 2*d* through which a cable 12 is passed. FIG. 8 is a side view showing the vibrator 1 having the cable 12 connected to it.

The surface of the case 2 in the part excluding the projection 2*c* is curved. In terms of what is shown in the diagrams, the part of the case 2 excluding the projection 2*c* is in a spherical or nearly spherical shape. A "spherical shape" may be not only a perfect spherical shape but also a substantially spherical shape with errors within a predetermined tolerance range. When the vibrator 1 is fitted to an ear of a user, a part of the case 2 corresponding to the dimension W1 from its bottom end to the projection 2*c* is hooked on the ear. To stably fit the vibrator 1 to the ear, it is preferable that the dimension W1 be large. For example, the dimension W2 of the projection 2*c* in the up-down direction can be equal to or smaller than one-half of the dimension W3 between the bottom end and the top end of the upper case 2*a*. It is preferable that the projection 2*c* extend in a direction tangential to the upper case 2.

Figure 5:
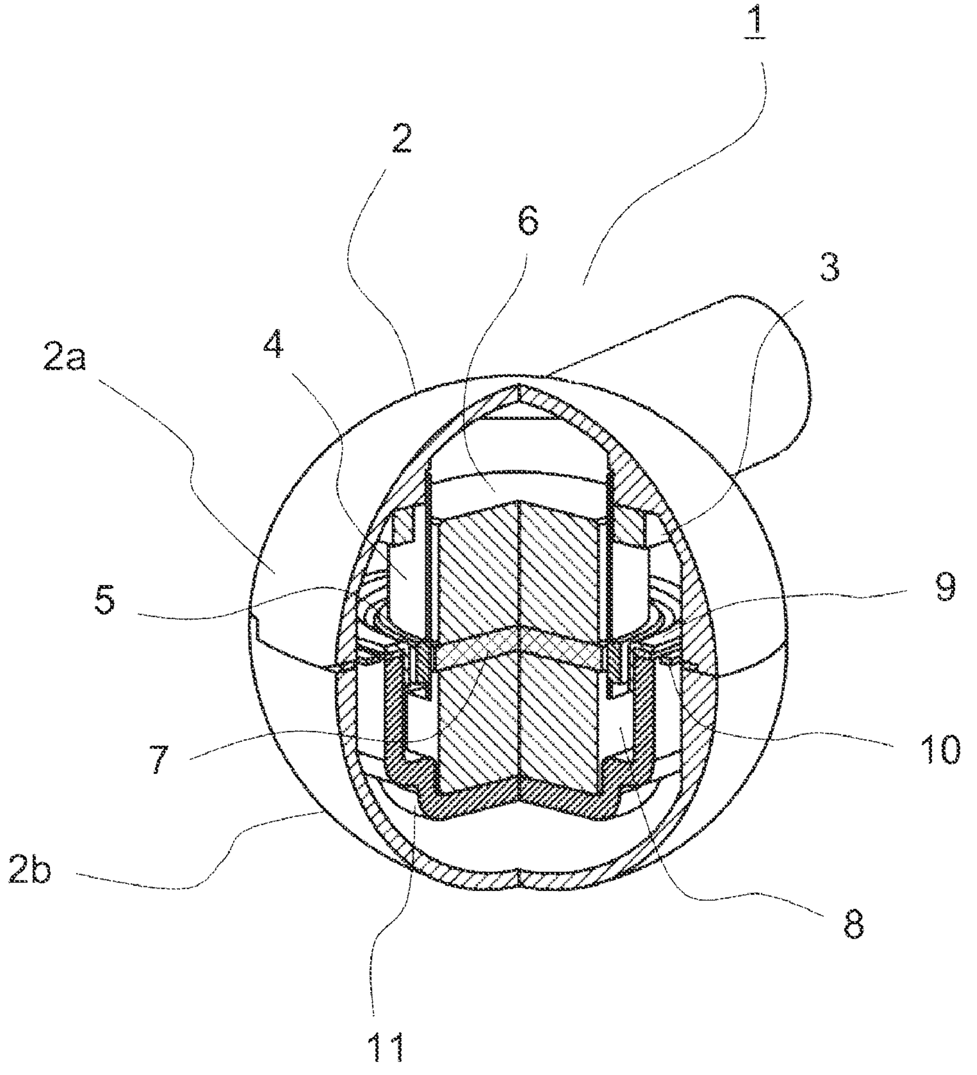
FIG. 5 is a diagram showing the internal structure of the vibrator in the hearing device according to the embodiment of the present invention.
Figure 6:
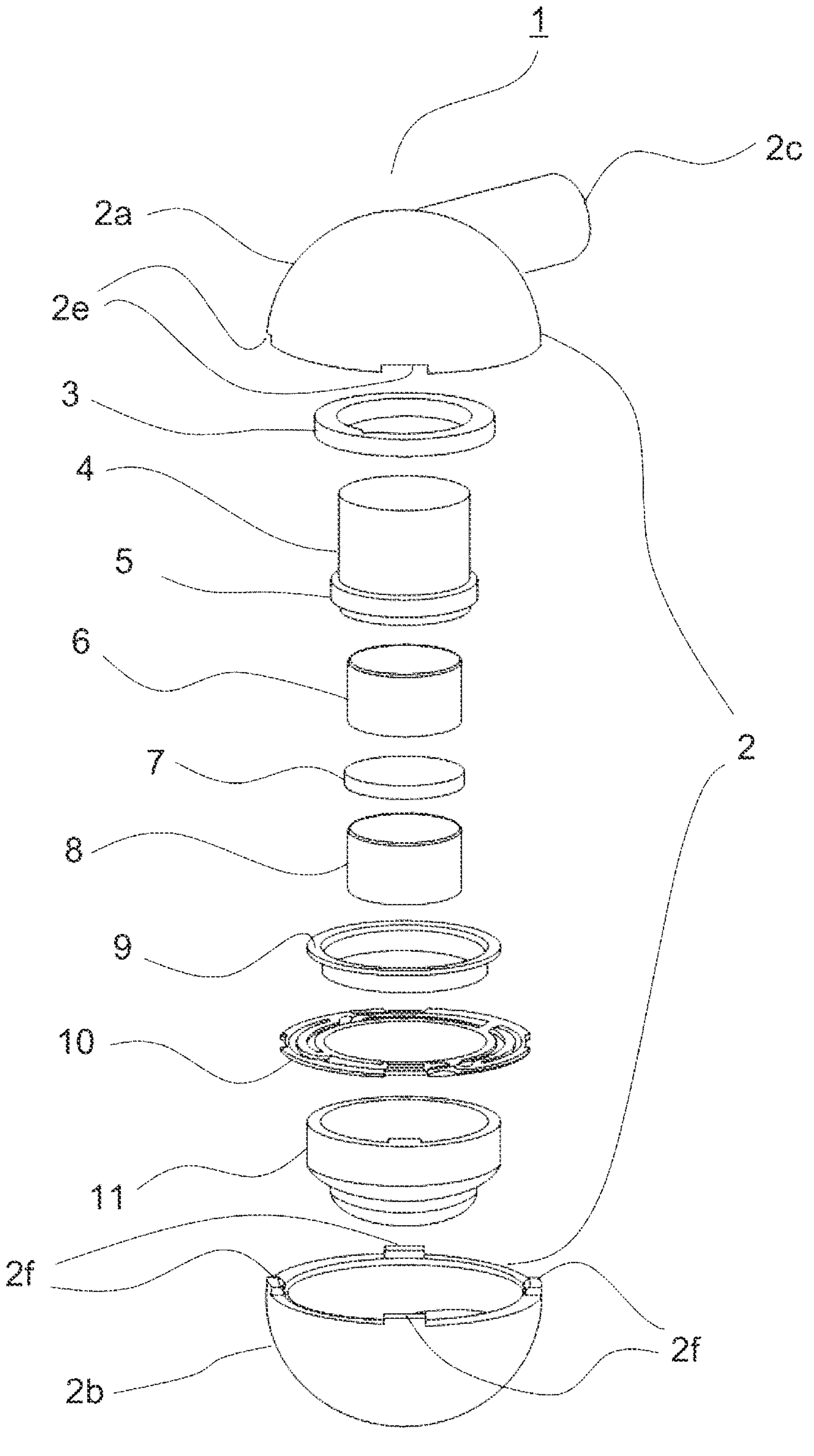
FIG. 6 is an exploded perspective view of the vibrator in the hearing device according to the embodiment of the present invention.

FIG. 5 is a diagram showing the internal structure of the vibrator 1 in the hearing device according to the embodiment of the present invention (a partial sectional view with part of the vibrator 1 cut off). FIG. 6 is an exploded perspective view of the vibrator 1 in the hearing device according to the embodiment of the present invention.

Housed in the case 2 are a coil bobbin 4, a coil 5, a magnet (a first magnet 6, a second magnet 8), a top plate 7, a frame 9, a damper 10, a yoke 11, and a circuit board 3.

The coil 5 is wound around the coil bobbin 4. The coil bobbin 4 is elongate in the up-down direction, and the top end of the coil bobbin 4 makes contact with the inner surface of the case 2 (upper case 2*a*). The coil 5 is fed with an electrical signal (a sound signal or the like). The coil bobbin 4 is formed of craft paper or the like, and the coil 5 is formed of copper or the like.

The circuit board 3 is fitted to the inner surface of the case 2 (upper case 2*a*). To the circuit board 3, the cable 12 (FIG. 8) is connected along with an end (not shown) of the coil 5 or a conductor (not shown) connected to the coil 5.

The circuit board 3 is close to the wiring hole 2*d*, and thus the cable 12 can be easily connected to the circuit board 3. The coil bobbin 4 is formed to be vertically elongate so that its top end makes contact with the circuit board 3 and the inner surface of the case 2 (upper case 2*a*), and thus an end (not shown) of the coil 5 or a conductor (not shown) connected to the coil 5 can be easily connected to the circuit board 3.

At least part of the magnet (first and second magnets 6 and 8) is arranged inside the coil bobbin 4. The magnet include the first magnet 6 and the second magnet 8. For the first and second magnets 6 and 8, for example, neodymium magnets are used.

The top plate 7 is arranged inside the coil bobbin 4. The first magnet 6 is arranged over the top plate 7. The second magnet 8 is arranged under the top plate 7. For the top plate 7, for example, iron (such as SPCC) is used.

The yoke 11 is open at its top end and has a bottom portion and a circumferential wall portion. The shape of the inner bottom of the yoke 11 corresponds to the shape of the bottom end of the second magnet 8 so that the bottom end of the second magnet 8 is fixed inside the yoke 11. This allows easy positioning of the second magnet 8. The yoke 11 is formed of a soft magnetic material (such as SPCC).

At least part of the coil bobbin 4 is arranged inside the yoke 11.

Figure 7:
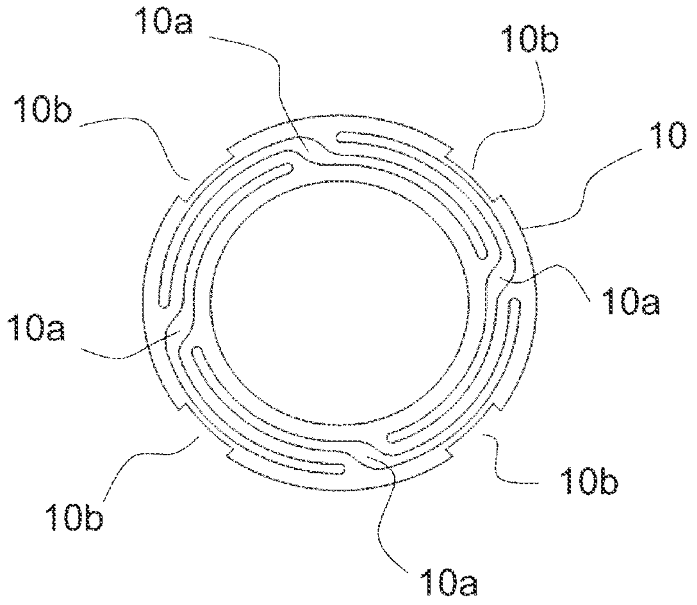
FIG. 7 is a top view of a damper in the vibrator in the hearing device according to the embodiment of the present invention.

An outer edge portion of the damper 10 is fixed to the case 2 and lies between the upper case 2*a* and the lower case 2*b*. That is, the outer edge portion of the damper 10 is held between the upper case 2*a* and the lower case 2*b*. The bottom face of an inner edge portion of the damper 10 makes contact with the top end of the circumferential wall portion of the yoke 11. The damper 10 is formed of, for example, stainless steel. As shown in FIG. 7, the damper 10 has through holes 10*a* formed in it that penetrate the damper 10 in the up-down direction. The damper 10 has a plurality of cuts 10*b* formed in a circumferential part of it. The upper case 2*a* has a plurality of depressions 2*e* formed in it, and the lower case 2*b* has a plurality of elevations 2*f* formed on it. The depression 2*e* and the elevations 2*f* fit together through the cuts 10*b*. As a result, the damper 10 is fitted between the upper case 2*a* and the lower case 2*b*.

The frame 9 fixes the damper 10 to the yoke 11. Specifically, the frame 9 is swaged to be fixed to the damper 10 and the yoke 11 so as to make contact with the top face of the inner edge portion of the damper 10 and the inner surface of the circumferential wall portion of the yoke 11 respectively. The frame 9 is formed of a soft magnetic material (such as SPCC [steel plate cold commercial]).

If the damper 10 is fixed to the yoke 11 with adhesive or the like (without using the frame 9), they will be fixed together unstably. Here, however, the damper 10 is fixed to the yoke 11 using the frame 9, and this makes it easy to fix them together. That is, fixing the damper 10 to the yoke 11 using the frame 9 in this way is suitable for mass production.

In addition, with the damper 10 fixed to the yoke 11 by the frame 9, the damper 10 supports the yoke 11. The yoke 11 is suspended inside the case 2 by the damper 10 and the frame 9. That is, the yoke 11 stays apart from the inner surface of the case 2.

If the yoke is fixed to the inner surface of the case with adhesive or the like, inconveniently, vibration may be perceived not in the entire sound range but only in a high-frequency band (for example, 5 kHz or higher). In this embodiment, the yoke 11 stays apart from the inner surface of the case 2, and this helps avoid such a problem.

At least parts of the frame 9 and the circumferential wall portion of and the yoke 11 face the coil 5. With this structure, a magnetic flux can be easily concentrated in the coil 5. In particular, the frame 9 and the yoke 11 being formed of a soft magnetic material or soft magnetic materials (such as SPCC) make it easier to concentrate a magnetic flux to the coil 5.

Concentrating a magnetic flux (increasing the magnetic flux density) results in a higher driving force for vibration and makes it easy to produce vibration.

If a hole is formed in the case, noise leaks through the hole in the case when the vibrator vibrates. In a case where suppressed noise is preferable, the case can be sealed. Thus, the case 2 may be sealed. When the case 2 is sealed, a closing member (not shown) to cover the wiring hole 2*d* may be used.

However, if the case is sealed and the vibrating plate (the damper and the like) in the case is formed in a shape without a hole, it is difficult to produce vibration. In particular, when the case is small, it is difficult for the vibration plate to move due to air pressure in the case. The space in the case is divided by the vibration plate into an upper space and a lower space. For example, when the vibration plate tends to move downward, the air in the lower space cannot move to the upper space. Thus, the vibration plate cannot vibrate, or only vibrates with a small amplitude.

In the embodiment, the damper 10 has the through holes 10*a* formed in it. The air above the damper 10 can move to below the damper 10 through the through holes 10*a*. Likewise, the air below the damper 10 can move to above the damper 10 through the through holes 10*a*. The movement of the air in the case 2 is not restricted. Not only when the case 2 is not sealed, but also when the space inside the case 2 is sealed, the damper 10 can vibrate with a large amplitude. Thus, even if the case 2 is small and sealed, the damper 10 can vibrate fully.

Since the damper 10 can vibrate fully not only when the case 2 is not sealed but also when the case 2 is sealed, the case 2 can vibrate sufficiently. Thus, it is possible to transmit sufficient vibration to a user of the vibrator 1.

Incidentally, the vibration of the damper or the yoke vibrates the case. When the vibrating case makes contact with a user, the vibration is transmitted to the user, and the user recognizes sound. Meanwhile, the vibration of the case vibrates the air around the case, and this produces air-conducted sound. The case 2 with a small surface area helps suppress air-conducted sound. Thus, while vibration is transmitted to the user, air-conducted sound can be prevented from leaking to around the user.

When the case 2 is sealed, no water nor sweat enters the case 2. Using a sealed case can be applied to a waterproof vibrator.

The damper 10 can be formed of liquid metal. The damper 10 may break through repeated vibration. Liquid metal, while being a metal, is elastic and is less prone to fatigue damage. The damper 10 formed of liquid metal can be used for an extended period.

Figure 9:
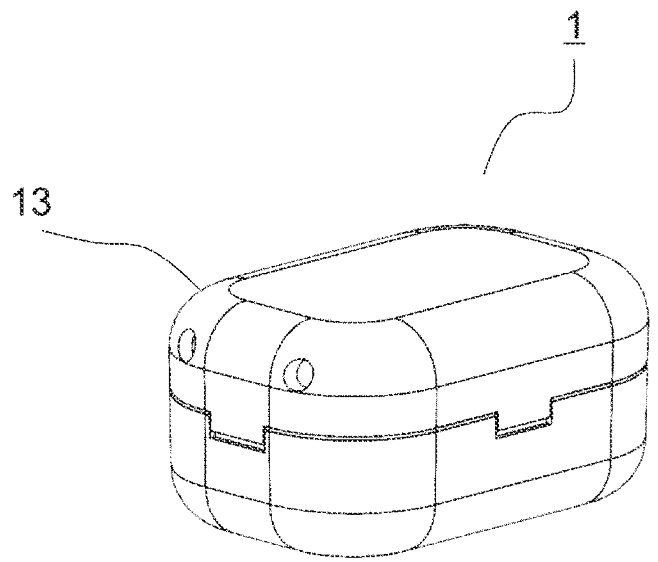
FIG. 9 is a perspective view showing an example, in another shape, of the vibrator in the hearing device according to the embodiment of the present invention.
Figure 10:
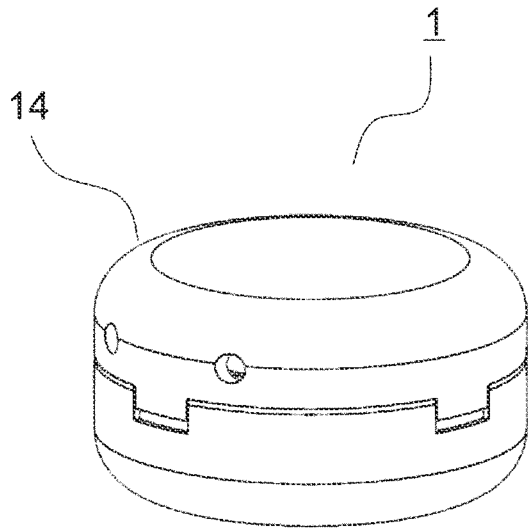
FIG. 10 is a perspective view showing an example, in yet another shape, of the vibrator in the hearing device according to the embodiment of the present invention.

The damper 10 is arranged at the middle in the case 2 in the up-down direction. The case 2 can be formed in a spherical or nearly spherical shape with no increase in its size. Here, "middle" may be not exactly middle but substantially middle within a predetermined tolerance range. The case may be in any other shape; it does not need to be in a spherical or nearly spherical shape like the case 2. FIG. 9 is a perspective view showing an example of the vibrator in another shape. FIG. 10 is a perspective view showing an example of the vibrator in yet another shape. For example, instead of the case 2, a case 13 (FIG. 9) or a case 14 (FIG. 10) may be used. When a case in another shape is used instead of the case 2, the shapes of different components such as the damper and the yoke are modified as necessary in accordance with the shape of the case. The vibrator 1 may be used as a cartilage conduction vibrator. Accordingly, a hearing device according to the present invention preferably includes the vibrator 1 described above as a cartilage conduction vibrator for transmitting a sound signal to the ear cartilage.

<Cartilage Conduction>

Figure 11:
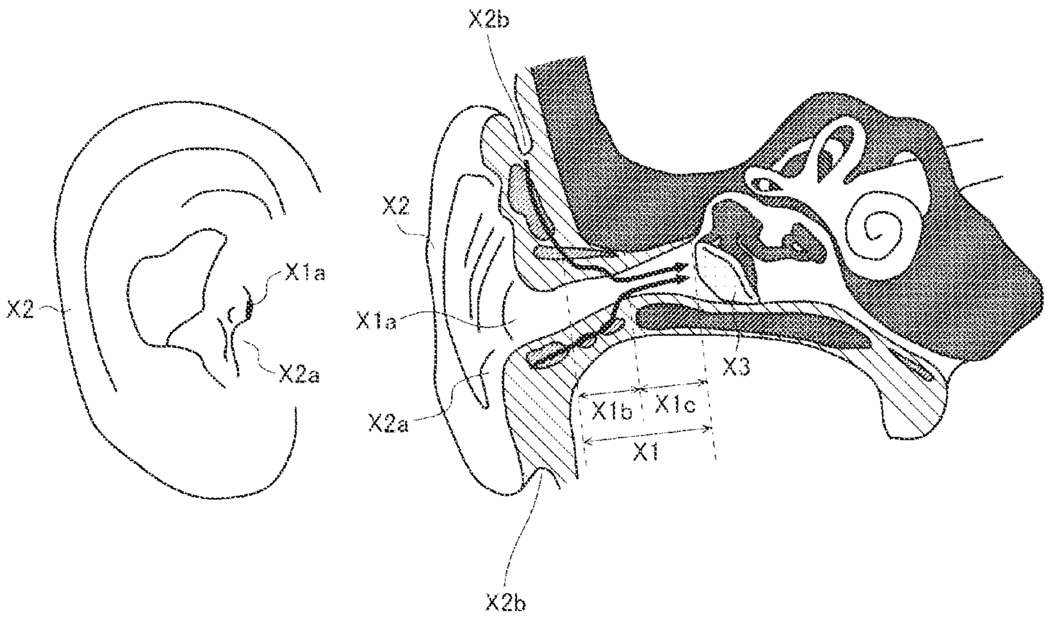
FIG. 11 is an anatomical diagram of the ear.

Next, the hearing mechanism in a hearing device including the vibrator 1 will be described with reference to FIG. 11. FIG. 11 is an anatomical diagram of the ear.

The present inventor, otorhinolaryngologist, discovered, for the first time in the world, a novel hearing mechanism (a third hearing mechanism that is neither air conduction nor bone conduction; see the bold solid-line arrows in FIG. 11) in which, when a vibrator is brought into contact with a cartilage tissue in the auricle X2 surrounding the external acoustic meatus entrance X1*a*, such as the tragus X2*a*, or the auricular cartilage X2*b* (in particular, a part near the external acoustic meatus entrance X1*a*) distributed in the back of the auricle X2, the vibration is transmitted to the cartilaginous external acoustic meatus X1*b* (approximately the front half of the external acoustic meatus X1 closer to the external acoustic meatus entrance X1*a*), and, as air-conducted sound (an air compressional wave due to acoustic vibration) produced at the inner surface of the cartilaginous external acoustic meatus X1*b* reaches the tympanic membrane X3 via the bony external acoustic meatus X1*c* (approximately the back half of the external acoustic meatus X1 closer to the tympanic membrane X3), sound is perceived. The inventors named this hearing mechanism "cartilage conduction" and have been proposing its application to mobile phones, hearing aids, and the like.

Unlike conventional bone conduction, which requires vibration of the heavy frontal and temporal bones, cartilage conduction requires vibration of the lighter tragus X2*a* or auricular cartilage X2*b* to make sound perceived. It thus requires very low energy to drive the vibrator.

Moreover, cartilage conduction is different from conventional air conduction (a phenomenon in which air-conducted sound coming from outside the external acoustic meatus entrance X1*a* vibrates the tympanic membrane X3 to make sound heard) in that it involves a phenomenon in which, when the external acoustic meatus entrance X1*a* is closed with a finger or the like, the acoustic energy inside the external acoustic meatus X1 increases to make sound perceived louder (an external acoustic meatus closure effect). Thus, closing the external acoustic meatus entrance X1*a* helps make sound perceived clearly even in a noisy environment.

Figure 12:
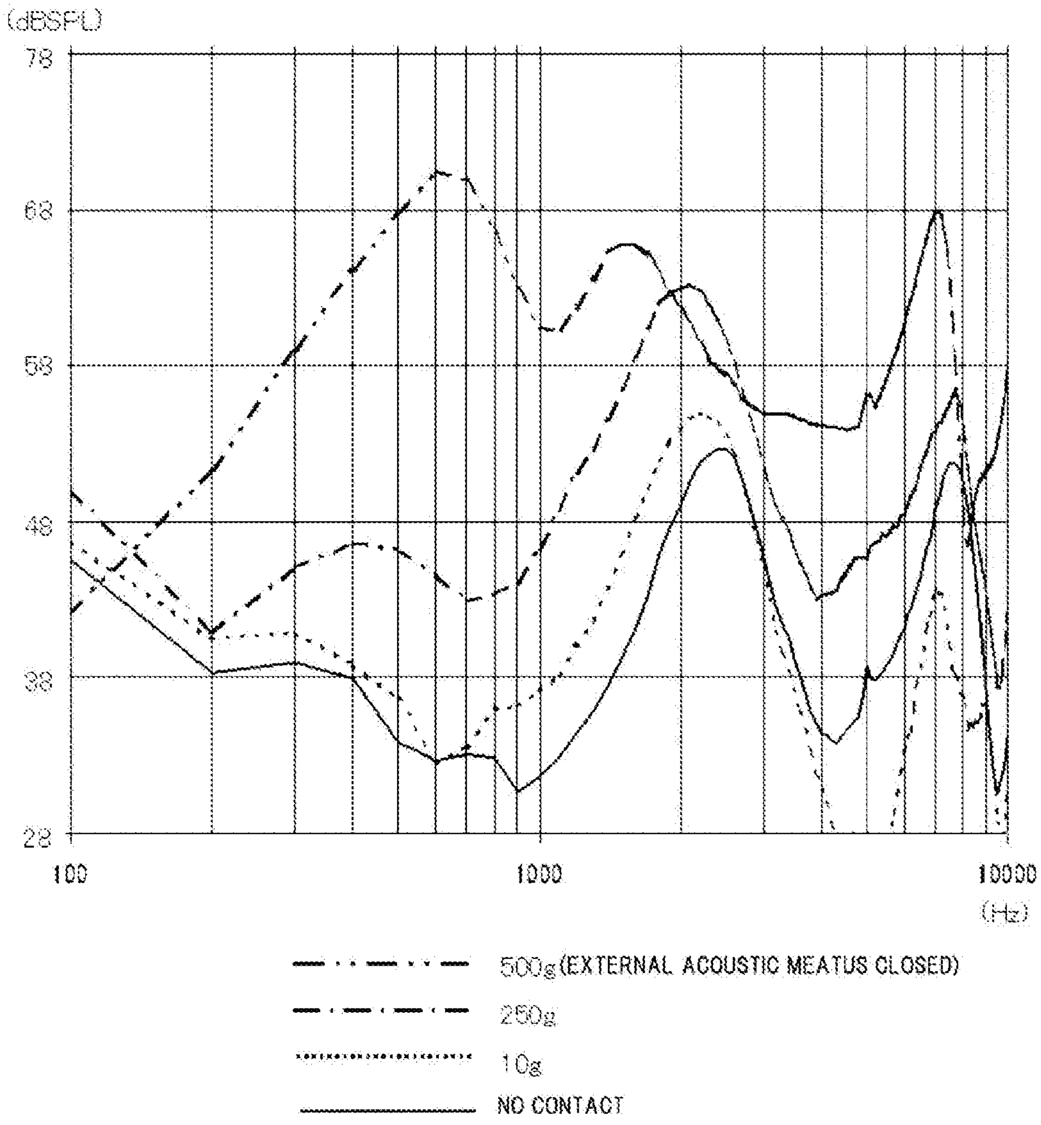
FIG. 12 is a graph showing one example of actually acquired data attesting to the effect of cartilage conduction.

FIG. 12 is a graph showing one example of actually acquired data attesting to the effect of cartilage conduction. The graph shows, in relation to frequency, the acoustic pressure in the external acoustic meatus at one centimeter from the external acoustic meatus entrance as observed when the outer wall surface of the vibrating body vibrated by a cartilage conduction vibration source was kept in contact with at least a part of the ear cartilage around the external acoustic meatus entrance with no contact with the helix.

The vertical axis of the graph represents acoustic pressure (dBSPL), and the horizontal axis represents frequency (Hz) on a logarithmic scale. Also to show the influence, on the acoustic pressure in the external acoustic meatus, of the contact pressure between the outer wall surface of the vibrating body and the ear cartilage around the external acoustic meatus entrance, in the graph, the acoustic pressure observed in a non-contact state (a state where only air-conducted sound produced at the outer wall surface of the vibrating body is heard) is represented by a solid line, the acoustic pressure observed with a contact pressure of 10 grams by a dotted line, the acoustic pressure observed with a contact pressure of 250 grams by a dash-dot line, and the acoustic pressure observed with the external acoustic meatus closed due to a further increase in contact pressure (a contact pressure of 500 grams) by a dash-dot-dot line.

As shown in FIG. 12, the acoustic pressure, compared to in a non-contact state, increases under contact with a pressure of 10 grams, and increases further as the contact pressure increases to 250 grams. From this state, increasing the pressure further to 500 grams increases the acoustic pressure even further.

As will be clear from the graph, when the outer wall surface of the vibrating body is brought into contact with at least a part of the ear cartilage around the external acoustic meatus entrance with no contact with the helix, compared to in a no contact state, the acoustic pressure in the external acoustic meatus at one centimeter from its entrance increases by at least 10 dB in the main audible frequency range (500 Hz to 2300 Hz), (compare the non-contact state indicated by the solid line with the state indicated by the dash-dot line).

As will also be clear from this graph, when the outer wall surface of the vibrator is brought into contact with at least a part of the ear cartilage around the external acoustic meatus entrance with no contact with the helix, as the contact pressure changes, the sound pressure in the external acoustic meatus at one centimeter from its entrance changes by at least 5 dB in the main audible frequency range (500 Hz to 2300 Hz) (compare a loose-contact state indicated by the dotted line with the contact state indicated by the dash-dot line).

From the above, it is clear that, even without an air-conducted sound generation mechanism (for example, a vibrating plate in a typical headphone), the desired sound pressure can be obtained by transmitting vibration from the cartilage conduction vibration source to the ear cartilage through contact. Hearing is achieved with the vibrating body kept in contact with the ear cartilage around the external acoustic meatus entrance without closing the external acoustic meatus. Thus, external sound can be perceived simultaneously with the sound from the vibrator, and this provides comfort wearing of the device with no blocked feeling in the ear.

Furthermore, as will also be clear from this graph, when the outer wall surface of the vibrating body is pressed more firmly against at least a part of the ear cartilage to close the external acoustic meatus (the measurements in FIG. 12 were acquired with the tragus folded as a result of the outer wall surface of the vibrating body being pressed from outside the tragus so as to close the external acoustic meatus), the acoustic pressure in the external acoustic meatus at one centimeter from its entrance increases by at least 20 dB in the main audible frequency range (300 Hz to 1800 Hz) compared to in a non-contact state. This indicates that adding an effect of blocking the external acoustic meatus significantly enhances the acoustic pressure (compare the non-contact state indicated by the solid line with a state indicated by the dash-dot-dot line where the external acoustic meatus is closed).

The measurements in this graph were all acquired with no change in the output of the cartilage conduction vibration source. As a state where the outer wall surface of the vibrating body makes contact with at least a part of the ear cartilage around the external acoustic meatus entrance with no contact with the helix, the measurements in this graph were acquired with the outer wall surface of the vibrating body kept in contact with the tragus from outside. The measurements in this graph in the external acoustic meatus-blocked state were acquired, as described above, with the tragus firmly pushed from outside to be folded up to create a state where the external acoustic meatus is closed.

This graph is merely one example, and individual variations will be observed when studied in more detail. To simplify and standardize the phenomenon, the measurements in this graph were acquired with the outer wall surface of the vibrating body kept in contact only with the outer side of the tragus over a small area.

However, an increase in acoustic pressure through contact depends also on the contact area with the ear cartilage. When the outer wall surface of the vibrating body is brought into contact with the ear cartilage around the external acoustic meatus entrance with no contact with the helix, the wider the contact area with the ear cartilage around the external acoustic meatus entrance, the larger the increase in acoustic pressure. With consideration given to the above, the values shown in this graph are general for a configuration utilizing cartilage conduction and are reproducible among a diverse group of subjects.

Although the graph was acquired with the external acoustic meatus closed as a result of the tragus being pushed from outside to increase the contact pressure to fold up the tragus, also in the case where the outer wall surface of the vibrating body is pushed into the external acoustic meatus entrance to close the external acoustic meatus, similar results can be obtained.

<Hearing Device in Use>

Figure 13:
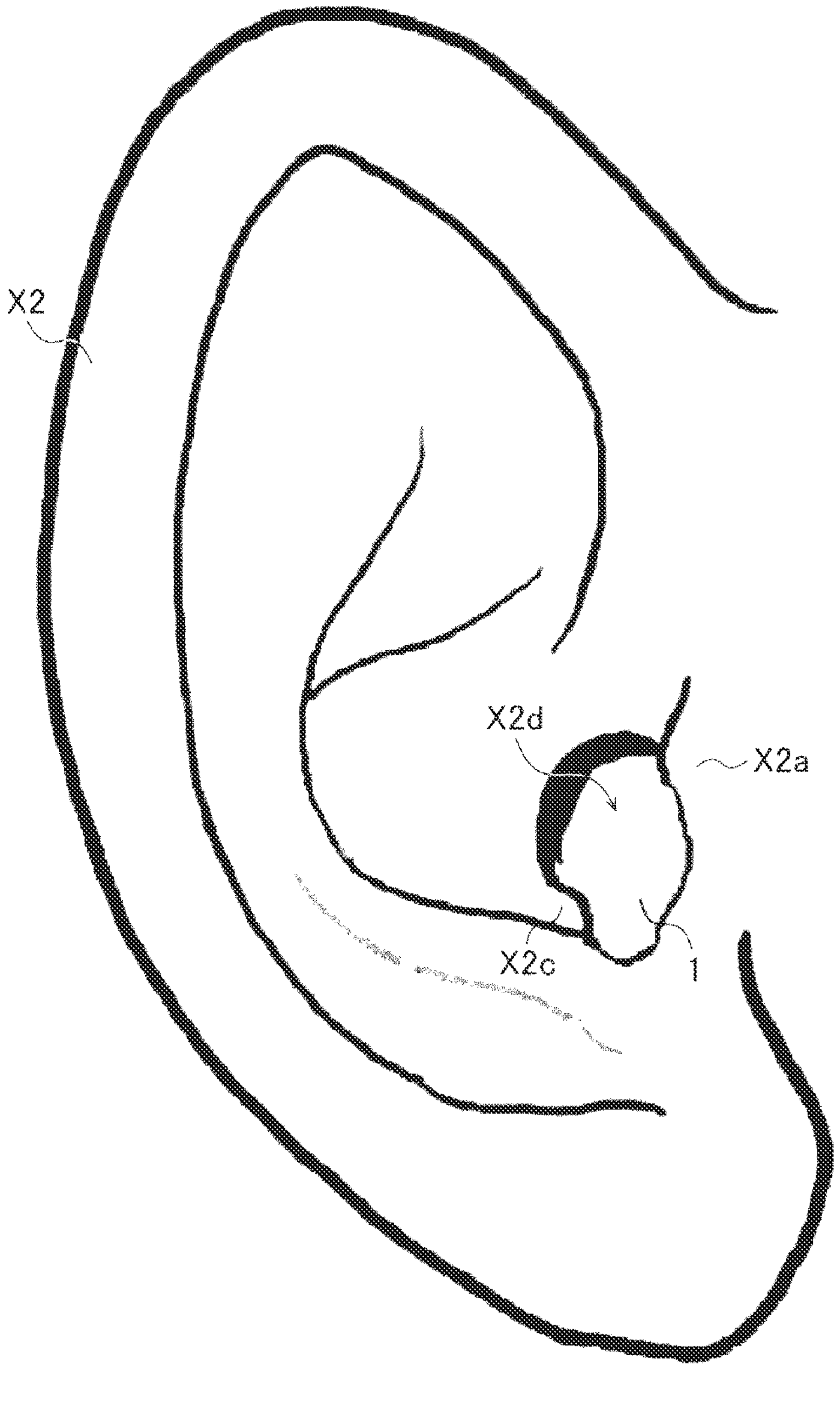
FIG. 13 is a diagram showing the hearing device in use.

FIG. 13 is a diagram showing a hearing device in use. The hearing device in FIG. 13 is used, for example, as a headphone for a smartphone, a portable music player, or the like, a hearing aid, or a microphone, and includes the vibrator 1 described previously as a cartilage vibrator.

The vibrator 1 generates vibration in accordance with a sound signal (an electrical signal carrying sound information) and transmits it to a cartilage tissue around the external acoustic meatus entrance X1*a*. In terms of what is shown in FIG. 13, the vibrator 1 is formed in a spherical shape sized so as to fit in the intertragic notch X2*d* (a lower part of the concha cavity) between the tragus X2*a* and the antitragus X2*c*. The vibrator 1 transmits vibration to the cartilage tissue that is in contact with the vibrator 1 to let a user perceive a sound.

Used as described above, the hearing device provides stable and quite natural hearing.

Further Modifications

The various technical features disclosed herein may be implemented in any other manners than in the embodiments described above, and allow for any modifications made without departure from their technical ingenuity. That is, the embodiments described above should be considered to be illustrative in all respects and should not be considered to be restrictive. It should be understood that the technical scope of the present invention is defined by the scope of claims and encompasses any modifications made in a scope and sense equivalent to the scope of claims.

INDUSTRIAL APPLICABILITY

The invention disclosed herein finds applications in, for example, headphones for smartphones, portable music players, and the like, hearing aids, and microphones.

REFERENCE SIGNS LIST

1 vibrator
2, 13, 14 case

3 circuit board
4 coil bobbin
5 coil
6 magnet (first magnet)
7 top plate
8 magnet (second magnet)
9 frame
10 damper
10*a* through hole
11 yoke
12 cable
X1 external acoustic meatus
X1*a* external acoustic meatus entrance
X1*b* cartilaginous external acoustic meatus
X1*c* bony external acoustic meatus
X2 auricle
X2*a* tragus
X2*b* auricular cartilage in the back of the auricle
X2*c* antitragus
X2*d* intertragic notch
X3 tympanic membrane

The invention claimed is:

1. A vibrator comprising:
a yoke that is open at a top end thereof, the yoke having a bottom portion and a circumferential wall portion;
a coil bobbin of which at least part is arranged inside the yoke;
a coil wound around the coil bobbin;
a magnet of which at least part is arranged inside the coil bobbin;
a damper that supports the yoke;
a frame that fixes the damper to the yoke; and
a case for housing the yoke, the coil bobbin, the coil, the magnet, the damper, and the frame,
wherein,
an outer edge portion of the damper is fixed to the case,
a bottom face of an inner edge portion of the damper makes contact with a top end of the circumferential wall portion of the yoke, and
the frame is swaged to be fixed to the damper and the yoke so as to make contact with a top face of the inner edge portion of the damper and with an inner surface of the circumferential wall portion of the yoke.

2. The vibrator according to claim 1, wherein a top end of the coil bobbin makes contact with an inner surface of the case.

3. The vibrator according to claim 1- or 2, further comprising a top plate arranged inside the coil bobbin, wherein:
the magnet include a first magnet and a second magnet,
the first magnet is arranged over the top plate, and
the second magnet is arranged under the top plate.

4. The vibrator according to claim 3, wherein a shape of an inner bottom of the yoke corresponds to a shape of a bottom end of the second magnet so that the bottom end of the second magnet is fixed inside the yoke.

5. The vibrator according to claim 1, wherein the frame and the yoke are formed of a soft magnetic material or soft magnetic materials.

6. The vibrator according to claim 5, wherein at least parts of the frame and the circumferential wall portion of the yoke face the coil.

7. The vibrator according to claim 1, wherein the damper has a through hole formed therein so as to penetrate the damper in an up-down direction.

8. The vibrator according to claim 1, wherein;
the case includes an upper case and a lower case, and
the outer edge portion of the damper is held between the upper case and the lower case.

9. The vibrator according to claim 8, wherein the upper case has a wiring hole through which a cable is passed.

10. The vibrator according to claim 9, further comprising a closing member for covering the wiring hole so that the case is sealed.

11. A hearing device comprising the vibrator according to claim 1 as a cartilage conduction vibrator for transmitting a sound signal to an ear cartilage.

* * * * *